(12) United States Patent
Corey et al.

(10) Patent No.: US 11,583,378 B2
(45) Date of Patent: Feb. 21, 2023

(54) SYSTEMS AND METHODS FOR MARKING ORTHODONTIC DEVICES

(71) Applicant: Braces On Demand Inc., Hicksville, NY (US)

(72) Inventors: Colin James Corey, Carlsbad, CA (US); Ammar Ahmed Syed, Unionville (CA); Thomas Patrick Shannon, Byron Center, MI (US)

(73) Assignee: Braces On Demand, Inc., Hicksville, NY (US)

( * ) Notice: Subject to any disclaimer, the term of this patent is extended or adjusted under 35 U.S.C. 154(b) by 179 days.

(21) Appl. No.: 17/011,071

(22) Filed: Sep. 3, 2020

(65) Prior Publication Data

US 2021/0015593 A1 Jan. 21, 2021

(51) Int. Cl.
*A61C 19/02* (2006.01)
*A61C 7/16* (2006.01)

(52) U.S. Cl.
CPC ............. *A61C 19/02* (2013.01); *A61C 7/16* (2013.01); *A61C 2202/00* (2013.01)

(58) Field of Classification Search
CPC ........ A61C 19/02; A61C 7/16; A61C 2202/00
USPC ............................................................. 433/9
See application file for complete search history.

(56) References Cited

U.S. PATENT DOCUMENTS

| | | | |
|---|---|---|---|
| 4,038,753 A | 8/1977 | Klein | |
| 5,975,893 A | 11/1999 | Chishti | |
| 6,206,695 B1 | 3/2001 | Wong | |
| 7,234,934 B2* | 6/2007 | Rosenberg | A61C 7/146 433/6 |
| 7,648,360 B2 | 1/2010 | Kuo | |
| 7,940,258 B2 | 5/2011 | Stark | |
| 10,136,966 B2 | 11/2018 | Reybrouck | |
| 10,179,035 B2 | 1/2019 | Shivapuja | |
| 10,314,673 B2 | 6/2019 | Schulhof | |
| 2011/0287378 A1* | 11/2011 | Dupray | A61C 7/285 433/9 |
| 2013/0081271 A1 | 4/2013 | Farzin-Nia | |
| 2014/0212827 A1* | 7/2014 | Tzou | A61C 7/14 427/2.29 |
| 2016/0095670 A1* | 4/2016 | Witte | A61C 7/002 433/24 |
| 2016/0228214 A1* | 8/2016 | Sachdeva | G05B 19/4097 |
| 2016/0346063 A1* | 12/2016 | Schulhof | A61C 7/002 |
| 2017/0281317 A1* | 10/2017 | Bukhary | A61C 7/146 |
| 2018/0153651 A1* | 6/2018 | Tong | B29C 64/386 |
| 2018/0214258 A1* | 8/2018 | Ruan | A61C 7/14 |

(Continued)

*Primary Examiner* — Matthew M Nelson
(74) *Attorney, Agent, or Firm* — Nixon Peabody LLP

(57) ABSTRACT

In some embodiments, apparatuses and methods are provided herein useful to marking orthodontic devices. In some embodiments, a carrier for orthodontic appliances comprises a base that is additively manufactured and comprising a plurality of wells configured to house orthodontic appliances and a marking integral to the base, wherein the marking identifies one or more of the orthodontic appliances and locations for the orthodontic appliances. In some embodiments, an orthodontic appliances comprises a body including features and a bonding surface, wherein the orthodontic appliance is additively manufactured and includes a marking integral to the orthodontic appliance, wherein the marking is located on one or more of the body and the bonding surface.

20 Claims, 7 Drawing Sheets

(56) References Cited

U.S. PATENT DOCUMENTS

| | | | | |
|---|---|---|---|---|
| 2018/0303583 A1* | 10/2018 | Tong | .................. | A61C 7/146 |
| 2019/0069980 A1* | 3/2019 | Kapec | ................... | A61C 7/14 |
| 2019/0298494 A1* | 10/2019 | Webber | ................ | A61C 7/145 |
| 2020/0405446 A1* | 12/2020 | Shannon | ................ | A61C 7/14 |
| 2021/0015593 A1* | 1/2021 | Shannon | ................ | B33Y 10/00 |
| 2021/0128275 A1* | 5/2021 | Suh | ..................... | B29C 64/336 |
| 2022/0110721 A1* | 4/2022 | Shannon | ................ | A61C 7/14 |
| 2022/0258420 A1* | 8/2022 | Märklin | ............ | A61C 13/0019 |

* cited by examiner

SYSTEMS AND METHODS FOR MARKING ORTHODONTIC DEVICES

TECHNICAL FIELD

This invention relates generally to orthodontics and, more specifically, the manufacture of orthodontic appliances.

BACKGROUND

Orthodontic clinicians seek to correct malocclusions by use of many different devices, such as braces, retainers, pallet expanders, positioners, etc. Braces, one of the most commonly used devices, include a number of orthodontic appliances such as brackets, archwires, and ligatures. The brackets are affixed to a patient's teeth and the archwire passes through slots in the brackets designed to receive the archwire. The ligatures secure the archwire within the slots. Because no two patients have identical malocclusions or facial geometries, the prescription for each patient's braces must be selected by the clinician. A prescription for braces typically includes specifically selected brackets, archwires, and ligatures.

In current systems, clinicians order a number of orthodontic appliances (e.g., brackets). In the example in which the orthodontic appliances are brackets, there is typically an identification scheme that allows the clinician to identify which bracket is which. For example, the brackets may be provided in a container that includes some sort of coding (e.g., numbering, lettering, etc.) included with the container. However, this coding is not integral to the container. Rather, application of the coding is a post-process event. As one example, the container can include a number of compartments and the appliances are placed in the compartments. The coding is then applied to the container to identify the appliance housed in each compartment. For example, a sticker can be applied to, or a code written by hand on, the container. There is significant risk of error because the coding is created and provided separately from the container. Accordingly, a need exists for better systems and methods of marking orthodontic devices.

BRIEF DESCRIPTION OF THE DRAWINGS

Disclosed herein are embodiments of systems, apparatuses, and methods pertaining to marking orthodontic devices. This description includes drawings, wherein.

Figure 1:
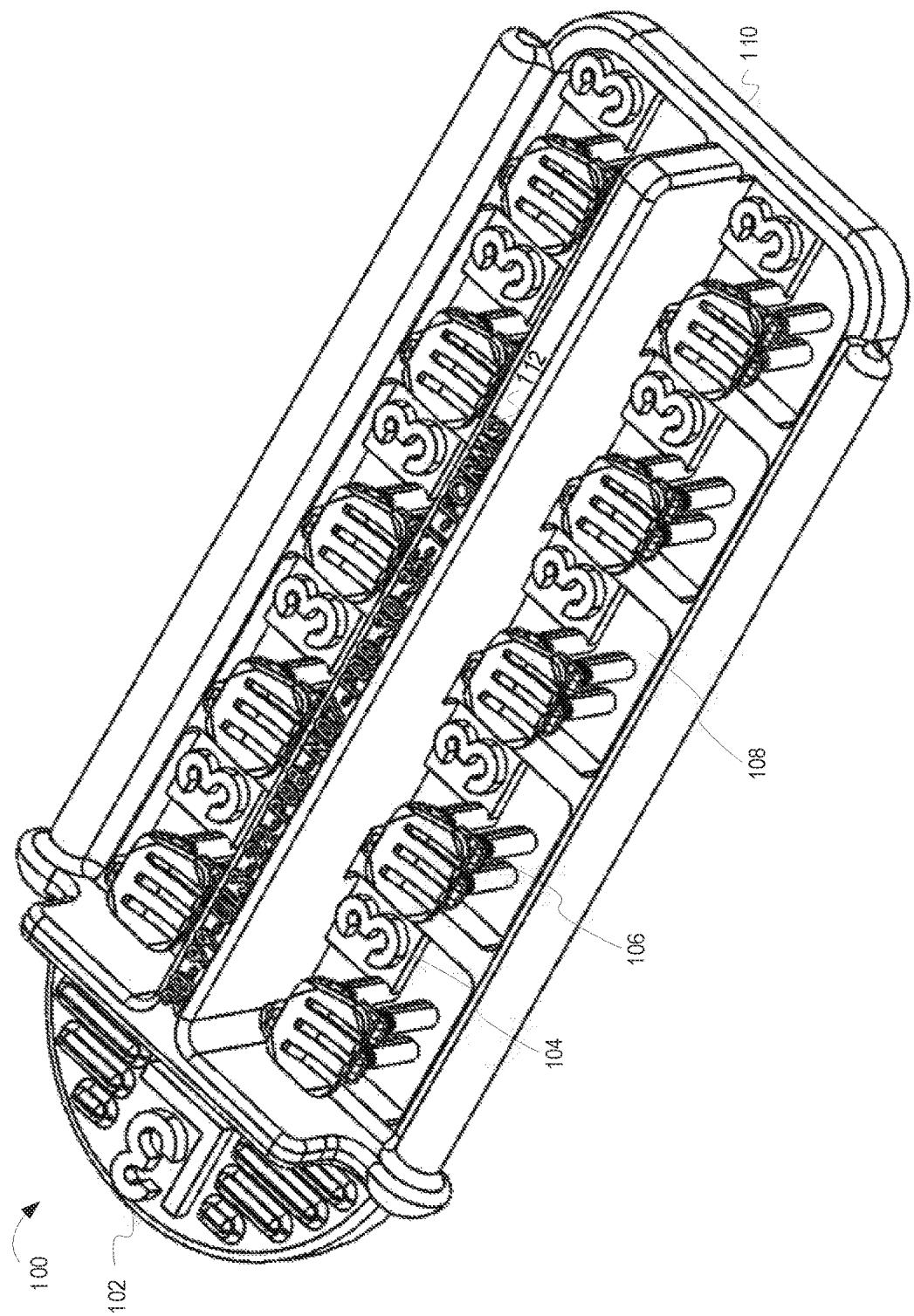
FIG. 1 is a perspective view of a carrier 100 for orthodontic appliances including various marking, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to orthodontic devices including markings. In some embodiments, a carrier for orthodontic appliances comprises a base, wherein the base is additively manufactured as a single structure, the base comprising a plurality of wells, wherein each of the plurality of wells is configured to house one of the orthodontic appliances and a marking, wherein the marking is integral to the base, and wherein the marking identifies the orthodontic appliances housed in the plurality of wells. In some embodiments, a carrier for orthodontic appliances comprises a base, wherein the base is additively manufactured as a single structure, the base comprising a plurality of wells, wherein each of the plurality of wells is configured to house one of the orthodontic appliances and markings, wherein the markings are integral to the base, wherein each of the markings is associated with one of the plurality of wells, and wherein the markings identify positions of the orthodontic appliances. In some embodiments, a direct-bonded orthodontic appliance comprises a body, wherein the body includes one or more features and a bonding surface, wherein the direct-bonded orthodontic appliance is additively manufactured, wherein the direct-bonded orthodontic appliance includes a marking, wherein the marking is integral to the direct-bonded orthodontic appliance, and wherein the marking is located on one or more of the body and the bonding surface.

As previously discussed, when clinicians order orthodontic appliances, the orthodontic appliances are typically provided to the clinicians in containers. The containers typically include compartments in which the orthodontic appliances are placed. To aid the clinician, some sort of coding may be provided to identify the orthodontic appliance placed in each compartment. Unfortunately, though the container may be designed specifically for use with orthodontic appliances, the container is not specific to a prescription or order of the orthodontic appliances. Further, though some sort of coding may be provided to aid in the identification of the orthodontic appliances, the orthodontic appliances typically include crude, if any, markings to aid in the identification of the orthodontic appliances. Accordingly, there exists significant opportunity for incorrect coding in the way of incorrect markings, incorrect placement of the orthodontic appliances, and unintended movement of the orthodontic appliances within the container.

The systems, methods, and apparatuses described herein seek to minimize or eliminate these problems via orthodontic devices including markings that are integral to the orthodontic devices and specific to the orthodontic devices. In one embodiment, a carrier for orthodontic appliances includes a base that is additively manufactured and includes one or more markings that are integral to the base. In another embodiment, a direct-bonded orthodontic appliance is additively manufactured and includes one or markings that are integral to the direct-bonded orthodontic appliance. In a third embodiment, the carrier and orthodontic appliances can be additively manufactured as a single structure and one or more of the base and the orthodontic appliances can include markings. The discussion of FIG. 1 provides an overview of an orthodontic device that includes a carrier and orthodontic appliances.

FIG. 1 is a perspective view of a carrier 100 for orthodontic appliances including various marking, according to some embodiments. The carrier 100 includes a base 110. The base 110 is additively manufactured as a single structure. The base includes a plurality of wells 108. The wells 108 are configured to house orthodontic appliances 106. In one embodiment, as shown in FIG. 1, the base 110 and orthodontic appliances 106 are additively manufactured as a single structure. It should be noted that this is not required. For example, in some embodiments, the orthodontic appliances 106 may be manufactured separately from the base 110, whether in an additive manufacturing manner or any other manufacturing technique.

The base 110 includes a number of markings. In the example depicted in FIG. 1, the base includes an identifier marking 112, a base marking 102, and well markings 104. Though the example depicted in FIG. 1 includes the identifier marking 112, the base marking 102, and the well markings 104, embodiments are not so limited. For example, the base 110 can include greater, or fewer, markings. Additionally, the markings can be located on any suitable portion of the orthodontic devices. The markings can include any suitable content, such as letters, numbers, symbols, etc. The markings can be of any suitable size based, for example, on the dimensions of the surfaces upon which the markings are located, readability preferences, etc. As one example and not intended to be limiting, the identifier marking 112 can comprise font that is between 0.030 inches and 0.090 inches, the base marking 102 can comprise font that is between 0.14 inches and 0.18 inches, and the well markings 104 can comprise font that is between 0.030 inches and 0.060 inches. It should be noted that these size ranges are provided as examples and markings of greater or smaller size can be used as desired.

The markings generally identify the orthodontic appliances 106 and/or positions of the orthodontic appliances 106. As one example, the identifier marking 112 can identify the orthodontic appliances 106 by identifying a prescription with which the orthodontic appliances 106 are associated. In this example, the prescription is specific to the orthodontic appliances 106 included in the carrier 100 and therefore identifies the orthodontic appliances 106. As another example, the identifier marking 112 can identify the orthodontic appliances 106 by identifying a database record in a database. In this example, a database includes data files. The data files are associated with different orthodontic appliances 106, groupings of orthodontic appliances 106, an orthodontic kit, etc. The data files are associated with database records (e.g., a database record identifies a specific data file). The data files can include data to additively manufacture the orthodontic appliances 106 and, in some cases, the carrier 100. Because the data files include data to additively manufacture the orthodontic appliances 106, the database record identifies the orthodontic appliances 106 included with the carrier 100. In some embodiments, the identifier marking 112 can act as a Unique Device Identifier (UDI), or other identifying marking, as required by law in some jurisdictions.

The base marking 102 can identify the orthodontic appliances 106 included with the carrier 100 or positions of the orthodontic appliances 106. The base marking 102 can identify the orthodontic appliances 106 by identifying a prescription with which the orthodontic appliances 106 are associated and/or a database record in a database. With respect to the positions of the orthodontic appliances 106, the base marking 102 can identify a position within a patient's mouth for the orthodontic appliances 106. The base marking 102 can identify the positions of the orthodontic appliances 106 in any suitable manner. Accordingly, the base marking 102 can include any suitable content, such as letters, numbers, symbols, etc. In one embodiment, and as depicted in FIG. 1, the base marking 102 identifies the positions of the orthodontic appliances 106 using Palmer Notation.

The well markings 104 identify positions for the orthodontic appliances 106. In one embodiment, as depicted in FIG. 1, each of the well markings 104 is associated with one of the wells 108. In such embodiments, each of the well markings 104 identifies a position for the orthodontic appliance 106 that is housed in the respective one of the wells 108. The well markings 104 can identify the positions of the orthodontic appliances 106 in any suitable manner. Accordingly, the well markings 104 can include any suitable content, such as letters, numbers, symbols, colors, etc. Though each of the orthodontic appliances 106 included in FIG. 1 is marked as having the same position, such is not required. For example, if the carrier 100 includes orthodontic appliances 106 for a single patient's mouth, at least some of the well markings 104 can identify a different position.

Regardless of the type of marking, the marking is integral to the base 110. That is, the base 110, including the marking, is additively manufactured as a single unit. For example, in one embodiment, the carrier 100 is additively manufactured 100 based on a data file. In such embodiments, the data file includes data to additively manufacture the marking during manufacture of the base 110. The marking can be additively manufactured during the manufacture of the base 110 by applying additional material (e.g., for a raised marking) and/or failing to apply material (e.g., for an indented marking) during the manufacture of the base 110.

Figure 2:
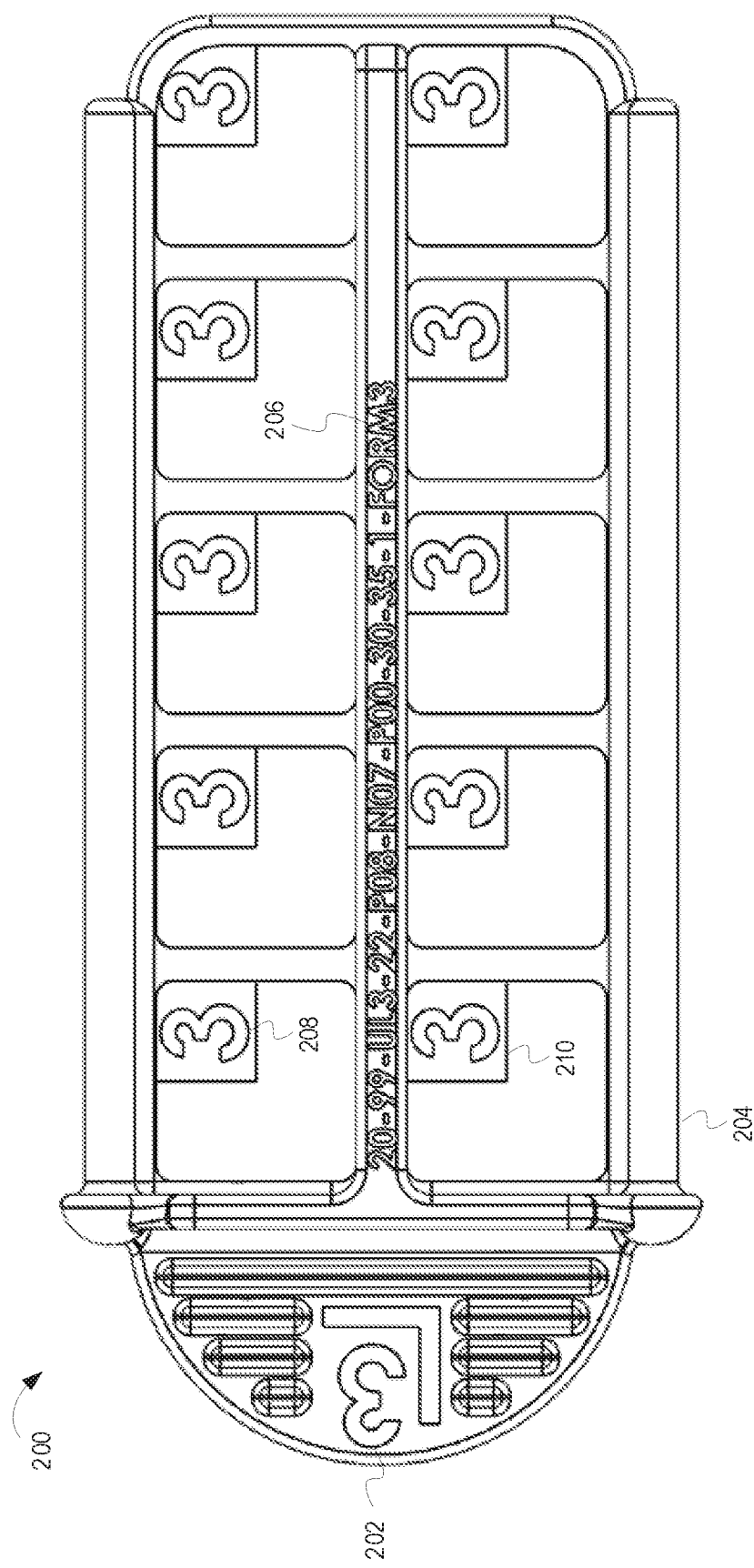
FIG. 2 is a top view of a carrier 200 for orthodontic appliances including various markings, according to some embodiments.
Figure 3:
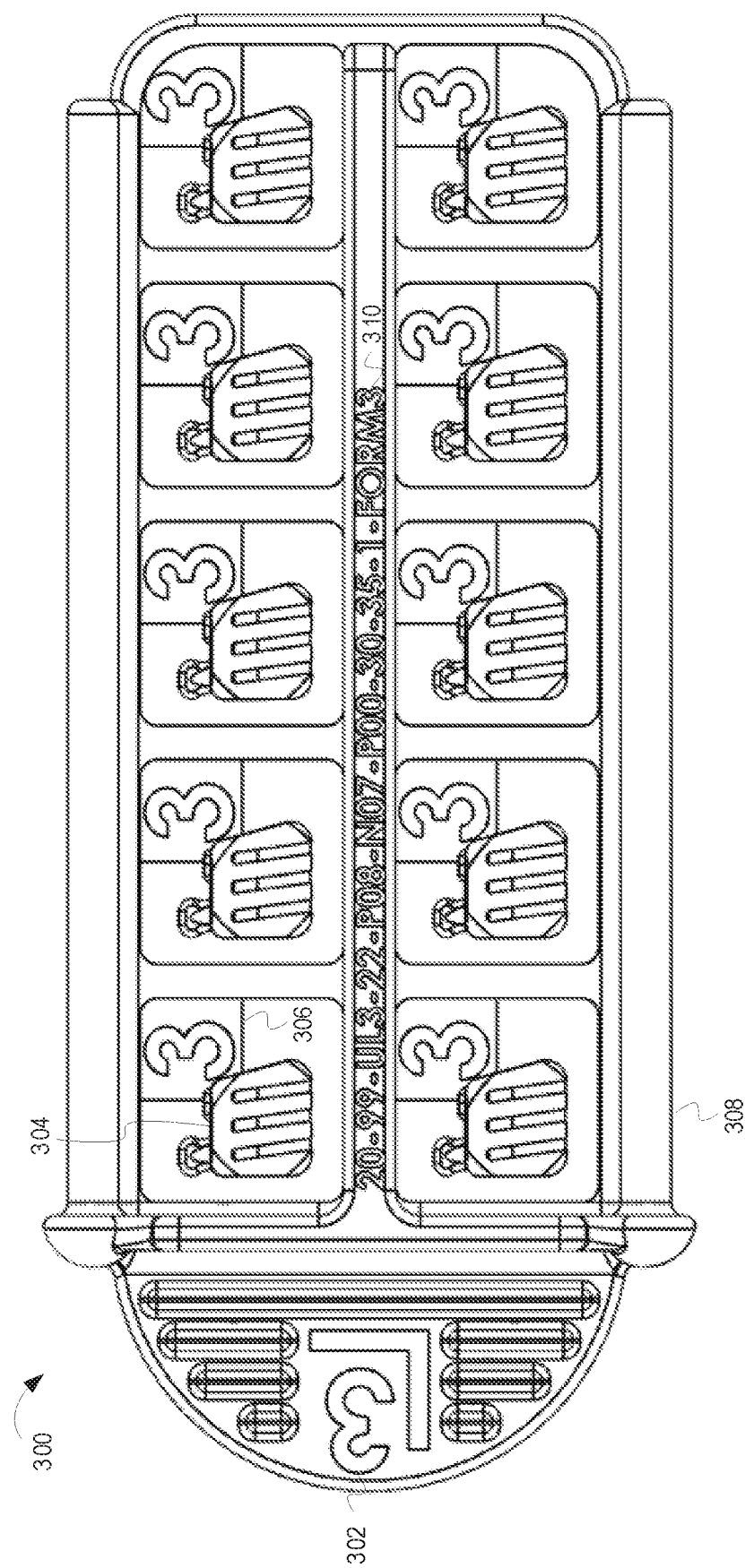
FIG. 3 is a top view of a carrier 300 housing orthodontic appliances 304 and including various markings, according to some embodiments.

FIG. 2 is a top view of a carrier 200 for orthodontic appliances including various markings, according to some embodiments. Like the carrier depicted in FIG. 1, the carrier 200 depicted in FIG. 2 includes a base 204. The base 204 includes wells 210 and a plurality of markings. The wells 210 are configured to house orthodontic appliances (as depicted in FIG. 3). Accordingly, the wells 210 can take any suitable form. For example, the wells 210 can be recessed chambers within the base 204, formed by walls or ridges of the base 204, etc. The carrier 200 depicted in FIG. 2 includes three types of markings: 1) an identifier marking 206; 2) a base marking 202; 3) and well markings 206. The markings can identify the orthodontic appliances associated with the carrier and/or the positions of the orthodontic appliances.

The identifier marking 206 can identify the orthodontic appliances by identifying a prescription with which the orthodontic appliances are associated and/or a database record in a database storing data files. As one example, the identifier marking 206 can identify a prescription by naming the prescription (e.g., 20-3-3-MBT-18-NOHK-FORM3, where "MBT" names the prescription, or simply stating "MBT"), a code for the prescription, etc. As another example, the identifier marking 206 can include values associated with the orthodontic appliances contained within the carrier 200. For example, the identifier marking 206 can indicate a type of orthodontic appliances as well as parameters for the orthodontic appliances (e.g., an M-D width, O-G height, a Tip angle, a Torque, an Offset, an Archwire Slot Width, an In/Out, etc. of the orthodontic appliances). Additionally, in some embodiments, the identifier marking 206 can include information that is not associated with values of the orthodontic appliances. For example, the identifier marking 206 can indicate a date upon which the data file was created, ordered and/or printed (e.g., a month, day, year, and/or time), a lot number, a revision number, etc. As one example, the identifier marking 206 depicted in FIG. 2 is "20-99-UL3-22-P08-N07-P00-30-35-1-FORM3," where each portion of the identifier marking 206 indicates a parameter of the orthodontic appliances as well as other values. In this example, each portion of the identifier marking is described in Table 1:

TABLE 1

| Value | Indication |
|---|---|
| 20 | Model Year (e.g., 2020) |
| 99 | Product (e.g., 99 signifies twin brackets) |
| UL3 | Tooth Position (e.g., Upper Left 3) |
| 22 | Archwire Slot Size (e.g., 0.022 Inches) |
| P08 | Tip Angle (e.g., Positive 8 degrees) |
| N07 | Torque Angle (e.g., Negative 7 degrees) |
| P00 | Offset Angle (e.g., 0 degrees) |
| 30 | In/Out (e.g., 0.030 Inches) |
| 35 | Mesial-Distal (M-D) Width (e.g., 0.135 Inches) |
| 1 | Hook Designation (e.g., 0 = No Hook, 1 = Distal Hook, 2 = Mesial Hook, 3 = Dual Hook) |
| FORM3 | Printer Platform (e.g., FormLabs Form3) |

It should be noted that the example identifier marking 206 provided in FIG. 2 and described in Table 1 is but an example and variations exist. That is, the portions of the identifier marking 206 can take any desired values and include greater number of, or fewer, portions than described herein. In some embodiments, the identifier marking 206 can be configured to comply with local, regional, national, and/or international device marking laws and/or requirements, such as the requirements of the Unique Device Identification System of the United States Food and Drug Administration.

The base marking 202 can be used to identify the orthodontic appliances included with the carrier 200 and/or positions of the orthodontic appliances. The base marking 202 can identify the orthodontic appliances by identifying a prescription with which the orthodontic appliances are associated and/or a database record in a database. With respect to the positions of the orthodontic appliances, the base marking 202 can identify a position within a patient's mouth for the orthodontic appliances. The base marking 202 can identify the positions of the orthodontic appliances in any suitable manner. Accordingly, the base marking 202 can include any suitable content, such as letters, numbers, symbols, color, etc. In one embodiment, and as depicted in FIG. 2, the base marking 102 identifies the positions of the orthodontic appliances 106 using Palmer Notation.

The well markings 206 identify positions for the orthodontic appliances housed in the wells 210. Each of the well markings 206 is associated with one of the wells 210. Though the example depicted in FIG. 2 includes the well markings 206 located within the wells 210, embodiments are not so limited. For example, the well markings 206 can be located near the wells 210 (e.g., above the wells 210, next to the wells 210, below the wells 210, etc.). However, the well markings 206 need not be located next to the wells 210 with which they are associated. For example, the well markings 206 can be included on a portion of the base 204 that is not adjacent to the wells 210 in a pattern that indicates with which well 210 each of the well markings 206 is associated. The well markings 206 can identify the positions of the orthodontic appliances in any suitable manner. Accordingly, the well markings 206 can include any suitable content, such as letters, numbers, symbols, color, etc.

FIG. 3 is a top view of a carrier 300 housing orthodontic appliances 304 and including various markings, according to some embodiments. The carrier 300 includes a base 306 and a number of markings. The markings are integral to the base and provide information related to orthodontic appliances 304 included with the carrier 300. For example, the markings can include an identifier marking 310, a base marking 302, and well markings 306.

Figure 4:
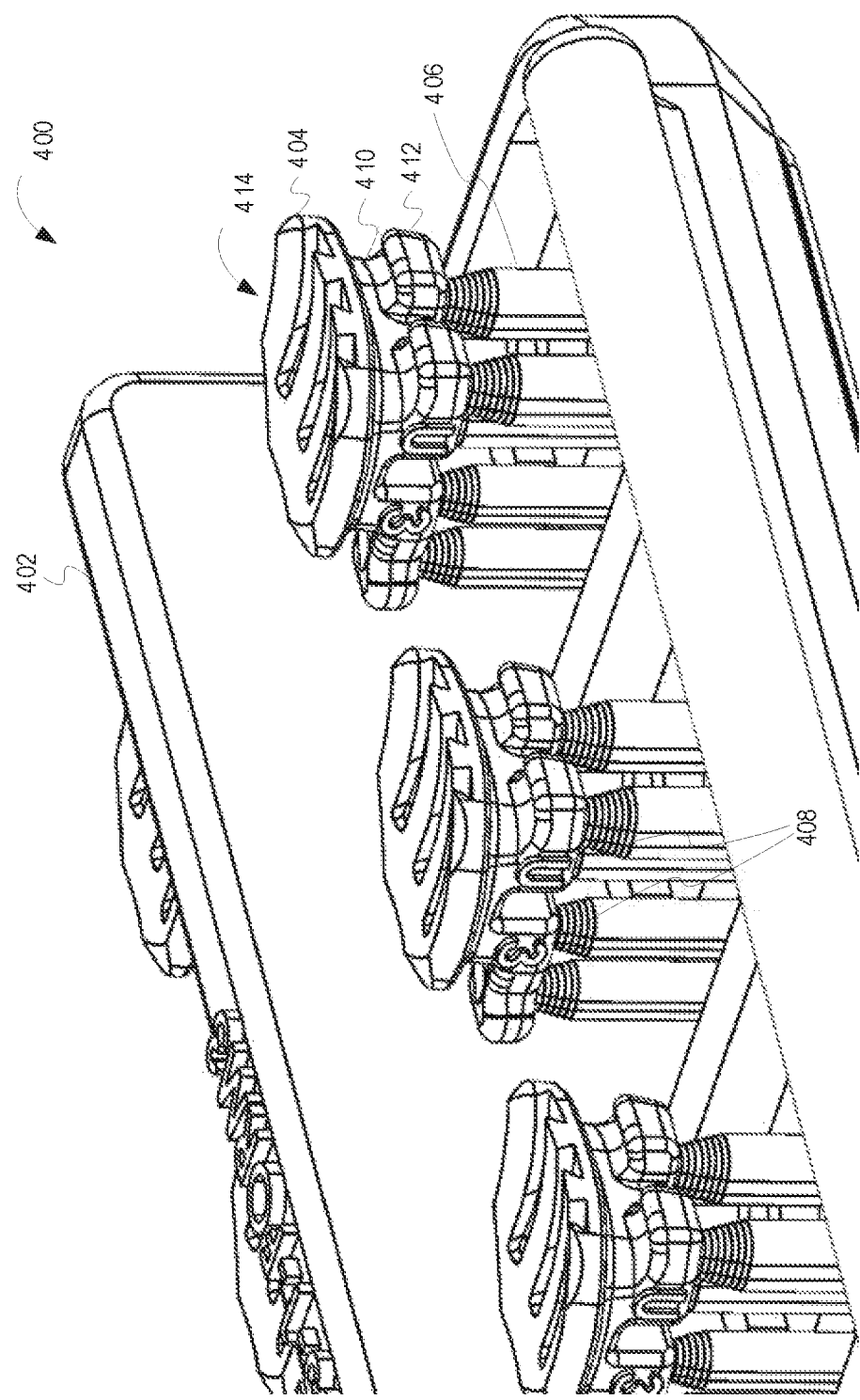
FIG. 4 is an exploded view of a portion of a carrier 400 housing orthodontic appliances 404 including various markings, according to some embodiments.

While the discussion of FIGS. 1-3 describes markings located on a base of a carrier for orthodontic appliances, the discussion of FIGS. 4 and 5 describes markings located on orthodontic appliances.

FIG. 4 is an exploded view of a portion of a carrier 400 housing orthodontic appliances 404 including various markings, according to some embodiments. In one embodiment, the orthodontic appliances 404 are direct-bonded orthodontic appliances (e.g., brackets, buccal tubes, bondable buttons, bondable Class II correctors, bondable Class III correctors, etc.). The carrier 400 orthodontic appliances 404 are affixed to the carrier 400 via support structures 406. In one embodiment, the orthodontic appliances 404 and the carrier 400 are additively manufactured as a single structure. Such an embodiment is further described in U.S. Nonprovisional application Ser. No. 17/011,121 titled SYSTEMS AND METHODS FOR MANUFACTURING ORTHODONTIC DEVICES filed on Sep. 3, 2020, which is hereby incorporated by reference in its entirety. However, such is not required. In some embodiments, the orthodontic appliances 404 may be manufactured independently of the carrier 400 and later affixed or secured to the carrier 400, or simply placed in wells of the carrier 400.

Figure 5A:
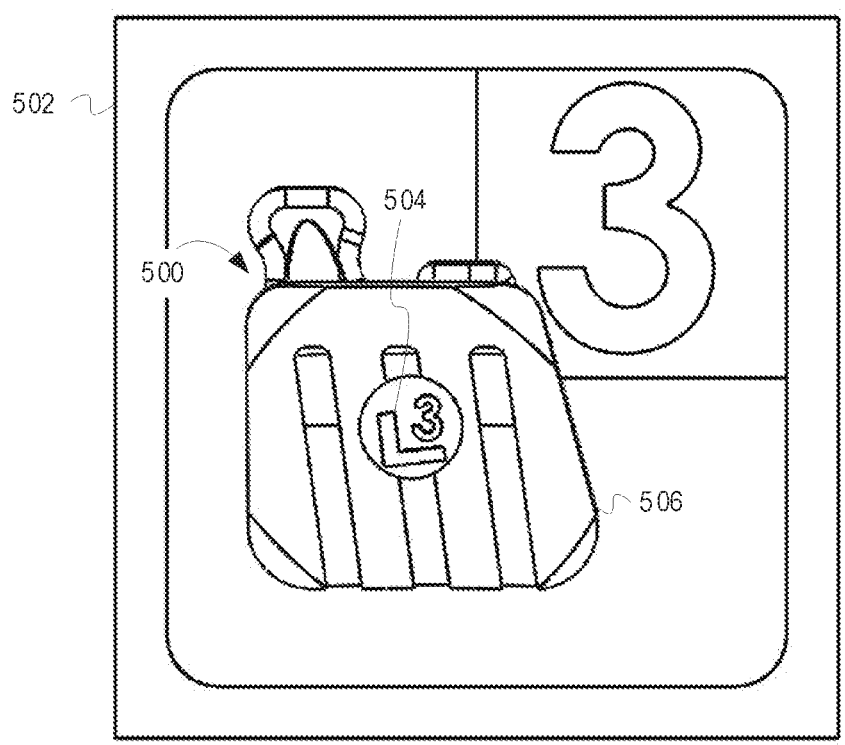
FIG. 5A is a top view of an orthodontic appliance 500 including a marking 504 and housed in a well 502, according to some embodiments.
Figure 5B:
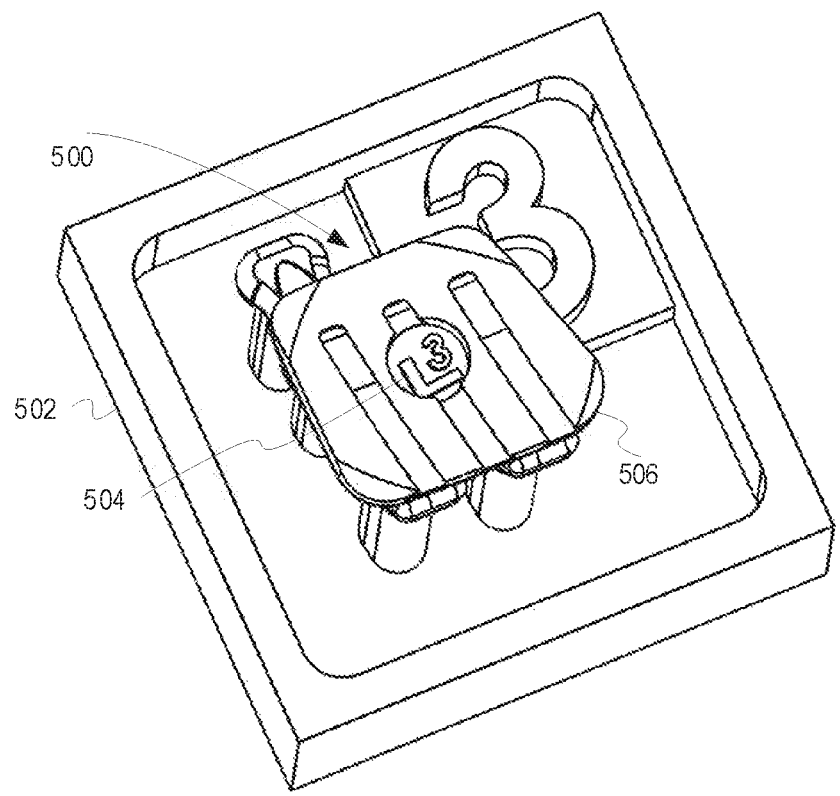
FIG. 5B is a perspective view of an orthodontic appliance 500 including a marking 504 and housed in a well 502, according to some embodiments.

The orthodontic appliances 404 include a body 410 and a bonding surface 414. The body 410 includes one or more features, such a tiewings 412, archwire slots, hooks, etc. The bonding surface 414 is the portion of the orthodontic appliance 404 that faces a patient's tooth. The orthodontic appliances 404 include markings. The markings can be located in any suitable location of the orthodontic appliances 404 (i.e., any location on the body 410 and/or bonding surface 414 of the orthodontic appliance 404). For example, the markings can be located on the tiewings 412 (i.e., tiewing makings 408), a facial surface, hook surface, etc. of the body 410. Additionally, or alternatively, the markings can be located on the bonding surface 414 (i.e., bonding surface markings), as depicted in FIGS. 5A and 5B. The orthodontic appliances 404 depicted in FIG. 4 include the tiewing markings 408. The tiewing markings 408 can be located on any suitable tiewing of the body 410. For example, as depicted in FIG. 4, the tiewing markings are located on the distal tiewings 412. The markings can be of any suitable size based, for example, on the dimensions of the surfaces upon which the markings are located, readability preferences, etc.

The markings can convey any desired information and can be comprised of any suitable features (e.g., letters, numbers, symbols, colors, etc.). For example, the markings can identify the orthodontic appliances 404 based on a type of orthodontic appliances 404 as well as parameters for the orthodontic appliances 404 (e.g., an M-D width, O-G height, a Tip angle, a Torque, an Offset, an Archwire Slot Width, an In/Out, etc. of the orthodontic appliances 404). Additionally, or alternatively, the markings can identify positions for the orthodontic appliances 404. For example, the markings can indicate locations in a patient's mouth for the orthodontic appliances 404 (e.g., upper or lower jaw, tooth number, a side of the patient's mouth, etc.). In the example provided in FIG. 4, the tiewing markings 408 specify "U3," signifying that the location of the orthodontic appliances is for the third tooth of the upper jaw. As previously discussed, the tiewing markings 408 depicted in FIG. 4 are located on the distal tiewings 412. Such positioning (i.e., on the distal tiewings 412) can be used to signify the side of the patient's mouth for which the orthodontic appliance is intended.

As previously discussed, the orthodontic appliances 404 are additively manufactured. The markings are integral to the orthodontic appliances 404. For example, the markings can be manufactured during the manufacture of the orthodontic appliances 404. In one embodiment, the orthodontic appliances 404 are additively manufactured based on a data file. In such embodiments, the data file includes data to additively manufacture the markings during manufacture of the orthodontic appliances 404. The markings can be additively manufactured during the manufacture of the orthodontic appliances 404 by applying additional material (e.g., for a raised marking) and/or failing to apply material (e.g., for an indented marking) during the manufacture of the orthodontic appliances 404.

FIGS. 5A and 5B are top and perspective views, respectively, of an orthodontic appliance 500 including a marking 504 and housed in a well 502, according to some embodiments. The orthodontic appliance 500 includes a body and a bonding surface 506. The orthodontic appliance includes a bonding surface marking 504. The bonding surface marking 504 is located on the bonding surface 506 of the orthodontic appliance 500.

The bonding surface marking 504 can convey any desired information and can be comprised of any suitable features (e.g., letters, numbers, symbols, colors, etc.). For example, the bonding surface marking 504 can identify the orthodontic appliance 500 based on a type of orthodontic appliance 500 as well as parameters for the orthodontic appliance 500 (e.g., an M-D width, O-G height, a Tip angle, a Torque, an Offset, an Archwire Slot Width, an In/Out, etc. of the orthodontic appliance 500). Additionally, or alternatively, the bonding surface marking 504 can identify positions for the orthodontic appliance 500. For example, the bonding surface marking can indicate a location in a patient's mouth for the orthodontic appliance 500 (e.g., upper or lower jaw, tooth number, a side of the patient's mouth, etc.). In the example provided in FIG. 5, the bonding surface marking 504 includes Palmer Notation signifying that the location of the orthodontic appliances is for the third tooth of the upper jaw of the left side of the patient's mouth.

As previously discussed, the orthodontic appliance 500 is additively manufactured. The bonding surface marking 504 is integral to the orthodontic appliance 500. For example, the bonding surface marking 504 can be manufactured during the manufacture of the orthodontic appliance 500. In one embodiment, the orthodontic appliance 500 is additively manufactured based on a data file. In such embodiments, the data file includes data to additively manufacture the bonding surface marking 504 during manufacture of the orthodontic appliance 500. The bonding surface marking 504 can be additively manufactured during the manufacture of the orthodontic appliance 500 by applying additional material (e.g., for a raised marking) and/or failing to apply material (e.g., for an indented marking) during the manufacture of the orthodontic appliance 500.

Figure 6:
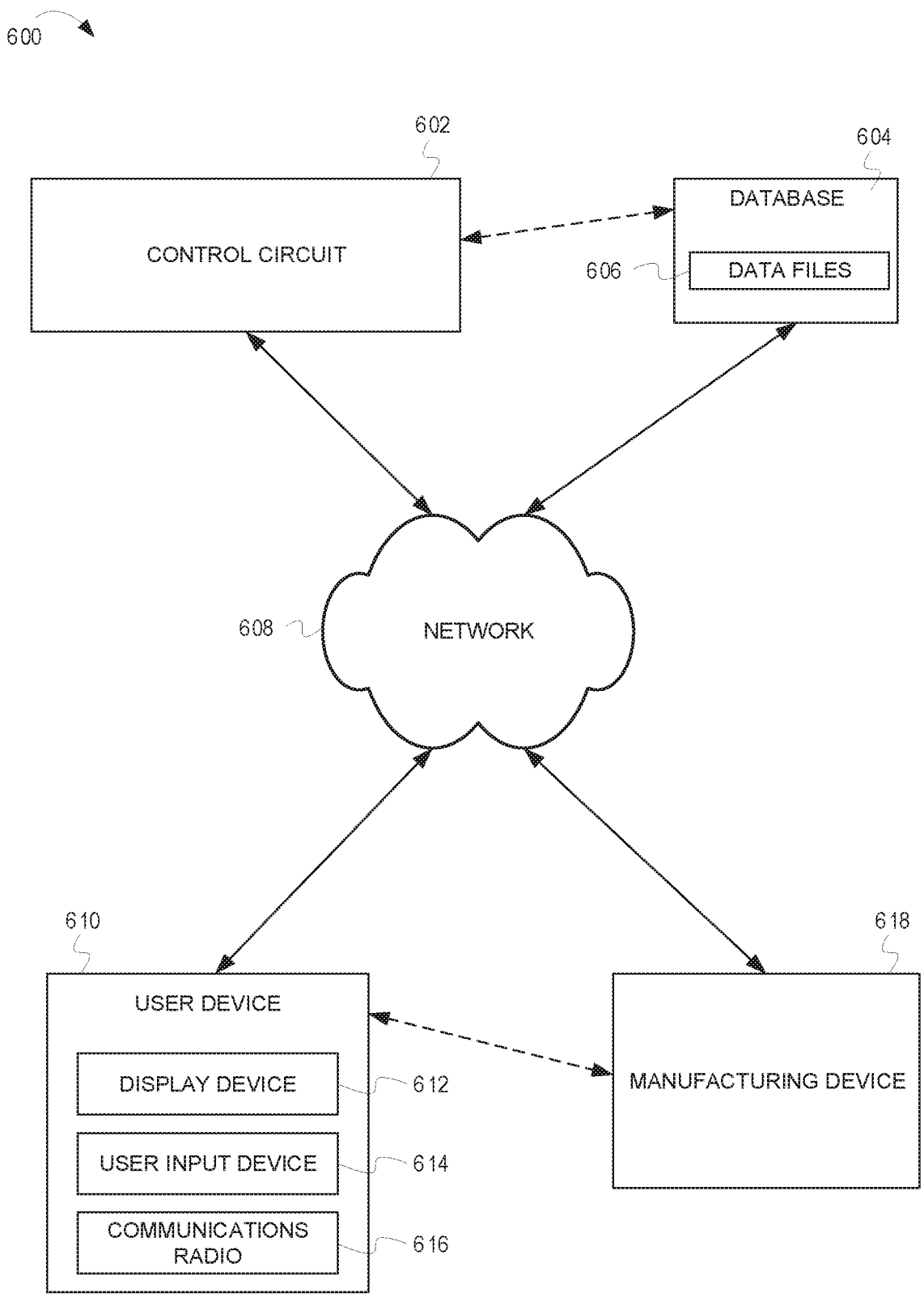
FIG. 6 is a block diagram of a system 600 for additively manufacturing orthodontic devices including markings, according to some embodiments.
Figure 7:
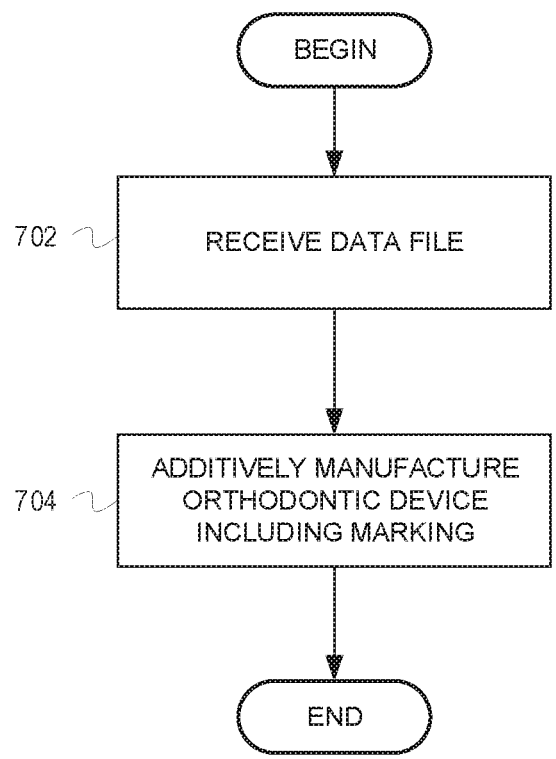
FIG. 7 is a flowchart including example operations for additively manufacturing orthodontic devices including markings, according to some embodiments.

While the discussion of FIGS. 4 and 5 provides additional detail regarding markings located on orthodontic appliances, the discussion of FIGS. 6 and 7 provides additional information regarding the additive manufacture of orthodontic devices (e.g., carriers for orthodontic appliances, orthodontic appliances, orthodontic appliance kits, etc.), as described in more detail in U.S. patent application Ser. No. 16/875,618 titled SYSTEMS AND METHODS FOR MANUFACTURE OF ORTHODONTIC APPLIANCES filed on May 15, 2020 and incorporated by reference herein in its entirety.

FIG. 6 is a block diagram of a system 600 for additively manufacturing orthodontic devices including markings, according to some embodiments. The system 600 includes a control circuit 602, a database 604, a user device 610, and a manufacturing device 618. One or more of the control circuit 602, the database 604, the user device 610, and the manufacturing device 618 are communicatively coupled via a network 608. The network 608 can include a local area network (LAN) and/or wide area network (WAN), such as the Internet. Accordingly, the network 608 can include wired and/or wireless links.

The user device 610 can be any suitable type of computing device (e.g., a desktop or laptop computer, smartphone, tablet, etc.). The user device 610 includes a display device 612. The display device 612 is configured to present a catalogue to a user. The catalogue includes orthodontic devices that the user can obtain via the system 600. For example, the catalogue can include all orthodontic devices that the user can purchase and/or manufacture via the manufacturing device 618. The user interacts with the catalogue via a user input device 614. The user can interact with the catalogue by navigating the catalogue, making selections from the catalogue, modifying orthodontic appliances included in the catalogue, etc. Accordingly, the user input device 614 can be of any suitable type, such as a mouse, keyboard, trackpad, touchscreen, etc. The user device 610 also includes a communications radio 616. The communications radio 616 transmits and receives information for the user device 610. For example, in the case of a smartphone, the communications radio 616 can be a cellular radio operating in accordance with the 4G LTE standard. Once a user has made a selection of an orthodontic device, the user device 610, via the communications radio 616 and the network 608, transmits an indication of the selection to the control circuit 602.

The control circuit 602 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 602 is configured (for example, by using corresponding programming as will be well understood by those skilled in the art) to carry out one or more of the steps, actions, and/or functions described herein.

By one optional approach the control circuit 602 operably couples to a memory. The memory may be integral to the control circuit 602 or can be physically discrete (in whole or in part) from the control circuit 602 as desired. This memory can also be local with respect to the control circuit 602 (where, for example, both share a common circuit board, chassis, power supply, and/or housing) or can be partially or wholly remote with respect to the control circuit 602 (where, for example, the memory is physically located in another facility, metropolitan area, or even country as compared to the control circuit 602).

This memory can serve, for example, to non-transitorily store the computer instructions that, when executed by the control circuit 602, cause the control circuit 602 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit may be remote from the user device 610 and/or the manufacturing device 618. For example, the user device 610 and the manufacturing device 618 may be located in a clinician's office (e.g., the user's office) whereas the control circuit 602, and possibly the database 604, are cloud-based. The control circuit 602 generally operates to retrieve data files 606 based on the user's selection of orthodontic appliances. The control circuit 602 retrieves the data files 606 from the database 604. The database 604 is configured to store the data files 606. The data files 606 are associated with orthodontic devices. The data files 606 are, for example, CAD files from which the orthodontic devices can be manufactured. The orthodontic device can include a carrier and/or orthodontic appliances. Accordingly, the data files include data to additively manufacture the orthodontic devices including any desired markings, as described herein. The control circuit 602 receives the indication of the orthodontic device and retrieves a data file based on the indication of the orthodontic device.

It should be noted that the indication of the orthodontic device may include more than one orthodontic device. For example, the indication of the orthodontic device can include multiple orthodontic appliances, such as full set of brackets for a patient, a set of orthodontic appliances that can be used with multiple patients, a carrier, an orthodontic kit, etc. Accordingly, the data file can be a file including instructions and/or specifications for multiple orthodontic devices. For example, the data file may include multiple data files and/or multiple specifications for a number of brackets.

After retrieving the data file, the control circuit 602 transmits the data file. In some embodiments, the control circuit 602 encrypts or otherwise protects the data file before transmission. The control circuit 602 can encrypt or otherwise protect the data file before transmission to prevent those other than the user from accessing the data file. Additionally, in some embodiments, the control circuit 602 can encrypt or otherwise protect the data file to control the user's access to the data file. For example, in some embodiments, the system is set up such that user's pay on a per manufacture or per print basis. That is, the user does not purchase, and may not later have access to, the data file. Rather, the user purchases access to print or otherwise manufacture an orthodontic appliance based on the data file once (or other specified number of times).

Dependent upon the embodiment, the control circuit 602 transmits the data file to the user device 610, the manufacturing device 618, and/or a third-party device (e.g., a laboratory capable of manufacturing the orthodontic appliance for the user). To whom, or to what device, the data file is transmitted may also aid in achieving access control. For example, in one embodiment, the control circuit 602 transmits the data file directly to the manufacturing device 618. Because the data file is not transmitted to the user device 610, the data file may not be easily accessible by the user device 610. Further, if an entity that controls the control circuit 602 controls the manufacturing device 618, access may to files received by the manufacturing device 618 may be further limited. In some embodiments, the control circuit 602 transmits the data files to the user device 610. In such embodiments, the user device 610 transmits, via the communications radio (e.g., over a universal serial bus (USB) connection, wireless connection based on the 802.11 standard, etc.), the data files to the manufacturing device 618.

The manufacturing device 618 additively manufacturers the orthodontic device(s) based on the data file. The manufacturing device 618 can be of any suitable type, such as a 3D printer. The manufacturing device 618 can be local to, or remote from, one or more of the control circuit 602 and the user device 610. For example, in one embodiment, the user device 610 and the manufacturing device 618 are located in the user's office (i.e., the user device 610 and the manufacturing device 618 are local to one another). Alternatively, the manufacturing device 618 may be located in a laboratory or some other facility that manufactures orthodontic devices for the user.

While the discussion of FIG. 6 provides additional detail regarding a system for additively manufacturing orthodontic devices including markings, the discussion of FIG. 7 provides additional detail regarding a process for additively manufacturing orthodontic devices including markings.

FIG. 7 is a flowchart including example operations for additively manufacturing orthodontic devices including markings, according to some embodiments. The flow begins at block 702.

At block 702, a data file is received. For example, the data file can be received from a database by a user device, control circuit, and/or third-party device. The database is configured to store the data files. The data files are associated with orthodontic devices. For example, the data file can be associated with an orthodontic kit (e.g., a carrier, orthodontic appliances included with the carrier, and support structures that secure the orthodontic appliances to the carrier), an orthodontic carrier, orthodontic appliances, etc. The data files include data to additively manufacture the orthodontic devices including any desired markings. Because the data files include data to additively manufacture the orthodontic devices including any desired markings, the markings are integral to the orthodontic devices (i.e., the markings are created during manufacture of the orthodontic device). The markings generally identify the orthodontic devices (e.g., the total orthodontic device, orthodontic appliances, etc.) and/or positions of the orthodontic appliances. For example, in the case of an orthodontic kit or set of orthodontic appliances, the marking(s) can identify a prescription of the orthodontic kit, the specific orthodontic appliances in the orthodontic kit, a database record in the database, etc. As another example, the marking(s) can identify a position(s) of the orthodontic. A position for the orthodontic appliance is a location in a patient's mouth for an orthodontic appliance. The flow continues at block 704.

At block 704, the orthodontic device including the marking(s) is additively manufactured. The orthodontic device can me additively manufactured using any suitable means. Because the orthodontic device including the marking(s) is additively manufactured, the marking(s) is integral to the orthodontic device. For example, the marking(s) is created by applying additional material, or preventing the application of additional material, during manufacture of the orthodontic device.

In some embodiments, a carrier for orthodontic appliances comprises a base, wherein the base is additively manufactured as a single structure, the base comprising a plurality of wells, wherein each of the plurality of wells is configured to house one of the orthodontic appliances and a marking, wherein the marking is integral to the base, and wherein the marking identifies the orthodontic appliances housed in the plurality of wells.

In some embodiments, a carrier for orthodontic appliances comprises a base, wherein the base is additively manufactured as a single structure, the base comprising a plurality of wells, wherein each of the plurality of wells is configured to house one of the orthodontic appliances and markings, wherein the markings are integral to the base, wherein each of the markings is associated with one of the plurality of wells, and wherein the markings identify positions of the orthodontic appliances.

In some embodiments, a direct-bonded orthodontic appliance comprises a body, wherein the body includes one or more features and a bonding surface, wherein the direct-bonded orthodontic appliance is additively manufactured, wherein the direct-bonded orthodontic appliance includes a marking, wherein the marking is integral to the direct-bonded orthodontic appliance, and wherein the marking is located on one or more of the body and the bonding surface.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An orthodontic kit, the orthodontic kit comprising:
   a plurality of orthodontic appliances; and
   a carrier, comprising:
      a plurality of wells, wherein each of the plurality of wells is configured to house one of the plurality of orthodontic appliances; and
      a marking, wherein the marking is integral to the carrier, and wherein the marking identifies the plurality of orthodontic appliances housed in the plurality of wells; and
   a plurality of groups of support structures, wherein each group of the plurality of groups of support structures secures one of the plurality of orthodontic appliances to the carrier;
   wherein the plurality of orthodontic appliances, the carrier, and the plurality of groups of support structures are additively manufactured as a single structure.

2. The orthodontic kit of claim 1, wherein the marking includes one or more of letters, numbers, and symbols.

3. The orthodontic kit of claim 1, wherein the orthodontic kit is additively manufactured based on a data file, and wherein the data file includes data to additively manufacture the marking during manufacture of the orthodontic kit.

4. The orthodontic kit of claim 3, wherein the data to additively manufacture the marking during manufacture of the orthodontic kit includes instruction to one or more of apply additional material and prevent application of additional material to create the marking.

5. The orthodontic kit of claim 1, wherein the identifier identifies one or more of a prescription with which the orthodontic appliances are associated and a database record in a database wherein the database includes data files that are associated with orthodontic kits.

6. The orthodontic kit of claim 1, wherein the carrier is specific to the plurality of orthodontic appliances housed in the plurality of wells.

7. The orthodontic kit of claim 6, wherein the carrier is specific to the plurality of orthodontic appliances housed in the plurality of wells such that the carrier is specific one or more of a prescription and order of the plurality of orthodontic appliances.

8. An orthodontic kit, the orthodontic kit comprising:
   a plurality of orthodontic appliances; and
   a carrier, comprising:
      a plurality of wells, wherein each of the plurality of wells is configured to house one of the plurality of orthodontic appliances;
      a set of first markings, wherein the set of first markings are integral to the carrier, wherein each marking of the set of first markings is associated with one of the plurality of wells, and wherein the markings of the set of first markings identify positions for the plurality of orthodontic appliances; and
      a second marking, wherein the second marking is integral to the carrier, and wherein the second marking identifies a prescription associated with the plurality of orthodontic appliances; and
   a plurality of groups of support structures, wherein each group of the plurality of groups of support structures secures one of the plurality of orthodontic appliances to the carrier;
   wherein the plurality of orthodontic appliances, the carrier, and the plurality groups of support structures are additively manufactured as a single structure.

9. The orthodontic kit of claim 8, wherein the set of first markings and the second marking include one or more of letters, numbers, and symbols.

10. The orthodontic kit of claim 8, wherein the orthodontic kit is additively manufactured based on a data file, and wherein the data file includes data to additively manufacture the set of first markings and the second marking during manufacture of the orthodontic kit.

11. The orthodontic kit of claim 10, wherein the data to additively manufacture the first set of markings and the second marking during manufacture of the orthodontic kit includes instruction to one or more of apply additional material and prevent application of additional material to create one or more of the first set of markings and the second marking.

12. The orthodontic kit of claim 8, wherein the positions for the plurality of orthodontic appliances are locations in a patient's mouth for the plurality of orthodontic appliances.

13. The orthodontic kit of claim 8, wherein the carrier is specific to the plurality of orthodontic appliances housed in the plurality of wells.

14. The orthodontic kit of claim 13, wherein the carrier is specific to the plurality of orthodontic appliances housed in the plurality of wells such that the carrier is specific one or more of a prescription and order of the plurality of orthodontic appliances.

15. A method for manufacturing an orthodontic kit, the method comprising:

additively manufacturing, by a manufacturing device, the orthodontic kit, wherein the orthodontic kit comprises:

a plurality of orthodontic appliances; and a carrier, comprising:

a plurality of wells, wherein each of the plurality of wells is configured to house one of the plurality of orthodontic appliances; and a marking, wherein the marking is integral to the carrier, and wherein the marking identifies the plurality of orthodontic appliances housed in the plurality of wells; and a plurality of groups of support structures, wherein each group of the plurality of groups of support structures secures one of the plurality of orthodontic appliances to the carrier;

wherein the plurality of orthodontic appliances, the carrier, and the plurality of groups of support structures are additively manufactured as a single structure.

16. The method of claim 15, wherein the marking includes one or more of letters, numbers, and symbols.

17. The method of claim 15, wherein the manufacturing device additively manufactures the orthodontic kit based on a data file, and wherein the data file includes data to additively manufacture the marking during manufacture of the orthodontic kit.

18. The method of claim 17, wherein the data to additively manufacture the marking during manufacture of the orthodontic kit includes instruction to one or more of apply additional material and prevent application of additional material to create the marking.

19. The method of claim 15, wherein the identifier identifies one or more of a prescription with which the orthodontic appliances are associated and a database record in a database wherein the database includes data files that are associated with orthodontic kits.

20. The method of claim 15, wherein the carrier is specific to the plurality of orthodontic appliances housed in the plurality of wells.

* * * * *